United States Patent
Mansour et al.

(10) Patent No.: US 11,892,075 B2
(45) Date of Patent: Feb. 6, 2024

(54) METHOD, CONTROL DEVICE AND COMPUTER PROGRAM PRODUCT FOR DETERMINING A POSITION OF A MOTOR VEHICLE

(71) Applicant: ZF Friedrichshafen AG, Friedrichshafen (DE)

(72) Inventors: Rachid Mansour, Markdorf (DE); Thomas Ascher, Amtzell (DE); Freddy Josef Frombach, Eriskirch (DE); Maik Würthner, Markdorf (DE); Robert Gronner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/780,742

(22) PCT Filed: Nov. 23, 2020

(86) PCT No.: PCT/EP2020/083006
§ 371 (c)(1),
(2) Date: May 27, 2022

(87) PCT Pub. No.: WO2021/105032
PCT Pub. Date: Jun. 3, 2021

(65) Prior Publication Data
US 2022/0412455 A1   Dec. 29, 2022

(30) Foreign Application Priority Data
Nov. 29, 2019   (DE) ..................... 10 2019 218 530.4

(51) Int. Cl.
*F16H 61/02*   (2006.01)
*F16H 59/50*   (2006.01)
(Continued)

(52) U.S. Cl.
CPC ......... *F16H 61/0213* (2013.01); *F16H 59/50* (2013.01); *F16H 59/66* (2013.01);
(Continued)

(58) Field of Classification Search
CPC ...... F16H 59/50; F16H 59/66; F16H 61/0213; F16H 2061/0234; G01S 19/42
See application file for complete search history.

(56) References Cited

U.S. PATENT DOCUMENTS 5,928,309 A * 7/1999 Korver ................... G01S 19/47
                                                        701/472
6,445,983 B1   9/2002 Dickson et al.
(Continued)

FOREIGN PATENT DOCUMENTS

DE   100 08 550   9/2001
DE   101 38 119   2/2003
(Continued)

OTHER PUBLICATIONS

German Patent Office, Office Action issued in German Patent Application No. 10 2019 218 530.4 (dated Sep. 14, 2020).
(Continued)

*Primary Examiner* — Edwin A Young
(74) *Attorney, Agent, or Firm* — Finch & Maloney PLLC

(57) ABSTRACT

Disclosed is a method for determining a position of a motor vehicle by means of a location device of the motor vehicle. First, a first position ($x_1$) related to an installation point of the location device in the motor vehicle is determined. In order to determine a position suitable for controlling the motor vehicle, with reference to the said first position ($x_1$) a second position ($x_2$) related to a center of gravity of the vehicle is determined, in that the first position ($x_1$) is offset by a distance (a) between the said installation point of the location device and the center of gravity of the vehicle.

15 Claims, 3 Drawing Sheets

(51) Int. Cl.
*F16H 59/66* (2006.01)
*G01S 19/42* (2010.01)

(52) U.S. Cl.
CPC .................. *F16H 2059/666* (2013.01); *F16H 2061/0234* (2013.01); *G01S 19/42* (2013.01)

(56) References Cited

U.S. PATENT DOCUMENTS

| | | |
|---|---|---|
| 6,895,320 B2 | 5/2005 | Bauer et al. |
| 7,129,889 B1 * | 10/2006 | O'Brien .................. G01S 19/42 |
| | | 342/357.395 |
| 8,095,309 B2 | 1/2012 | Ryu et al. |
| 2002/0165646 A1 | 11/2002 | Bohr et al. |

FOREIGN PATENT DOCUMENTS

| | | |
|---|---|---|
| DE | 10 2004 010 197 | 9/2005 |
| DE | 10 2008 026 370 | 3/2009 |

OTHER PUBLICATIONS

European Patent Office, International Search Report issued in International Patent Application No. PCT/EP2020/083006 (dated Feb. 15, 2021).
European Patent Office, Written Opinion issued in International Patent Application No. PCT/EP2020/083006 (dated Feb. 15, 2021).

* cited by examiner

METHOD, CONTROL DEVICE AND COMPUTER PROGRAM PRODUCT FOR DETERMINING A POSITION OF A MOTOR VEHICLE

RELATED APPLICATIONS

This application claims priority under 35 U.S.C. § 371 as a U.S. National Application of application no. PCT/EP2020/083006, filed on 23 Nov. 2020, which claims priority to German Patent Application no. 10 2019 218 530.4, filed 29 Nov. 2019, the contents of which are hereby incorporated herein by reference in their entireties.

FIELD OF THE DISCLOSURE

The invention relates to a method for determining a position of a motor vehicle, wherein by means of a location device of the motor vehicle, first of all a first position relative to an installation point of the location device in the motor vehicle is determined. Furthermore, the invention relates to a method for controlling a motor vehicle, a control unit, a computer program product and a data carrier.

BACKGROUND

Motor vehicles are often equipped with location devices by means of which a current position of the motor vehicle concerned can be determined. Besides navigation, the current position of the motor vehicle is often taken into account for the control of various devices of the motor vehicle, such as driver assistance systems. For example, sometimes an anticipatory reaction to certain particularities of the approaching route segment can be initiated, for example by a corresponding regulation of a motor vehicle transmission, but also in order to verify data captured by other sensors with reference to data determined by way of the current position.

For example, from DE 10 2008 026 370 A1 a method for controlling a motor vehicle is known, wherein for the control of the motor vehicle in this case, among other things, a longitudinal acceleration of the motor vehicle is determined by a sensor. To determine a sensitivity and a measurement deviation of the sensor, in addition a speed of the motor vehicle in the longitudinal direction is determined with reference to the data from a location device by means of which a position of the motor vehicle can be ascertained. Here, the speed of the motor vehicle in the longitudinal direction is determined for a center of gravity of the motor vehicle, and for that purpose the position of the location device is taken into account.

SUMMARY

Starting from the above-described prior art, the purpose of the present invention is now to provide a method for determining the position of a motor vehicle such that the manner of determining the position of the motor vehicle should be suitable for controlling the motor vehicle.

Beginning from the preamble of the independent claims, that objective is achieved in combination with its characterizing features. The subsequent, dependent claims indicate in each case advantageous further developments of the invention. In addition, the present disclosure relates to a method for controlling a motor vehicle. Furthermore, a control unit, a computer program product, and a data carrier are disclosed.

According to the invention, in a method for determining the position of a motor vehicle, first of all a first position relative to an installation point of the location device in the motor vehicle is determined. Thus, during the course of the method according to the invention a first position of the motor vehicle is determined, wherein this determination is carried out by means of a location device of the motor vehicle and the said first position is related to an installation point of the location device. In this context the latter statement means that the first position is relative to the installation point of the location device in the motor vehicle, wherein here the installation position in the longitudinal direction of the motor vehicle is the decisive factor.

In the context of the invention "determination of a position of the motor vehicle" is understood to mean the determination of a location of the motor vehicle, i.e. its current position in the geographical co-ordinate system. Correspondingly the said first position, which is related to the installation point of the location device of the motor vehicle, is in fact the geographical position of the location device.

The invention incorporates the technical principle that with reference to the first position a second position related to a center of gravity of the vehicle is determined, in that the first position is offset relative to the center of gravity of the vehicle by a distance to the installation point of the location device. In other words, in the context of the method according to the invention, from the first position which was determined by means of the location device of the motor vehicle and which is related to its installation point, a second position is derived, which represents the geographical location of a center of gravity of the motor vehicle. So, the second position is determined from the first position, in that in the motor vehicle a distance between the installation point of the location device in the motor vehicle and the center of gravity of the vehicle is determined and offset relative to the first position.

Such a method for determining a position of a motor vehicle has the advantage that by determining the position of the center of gravity of the motor vehicle a position of the motor vehicle suitable for the control of various functions, such as driver assistance systems, is determined. This is in particular because for the anticipatory control of the motor vehicle in relation to a route segment ahead of the motor vehicle, in order to carry out the regulation measure at exactly the right time it is important to know the current position of the center of gravity of the motor vehicle as accurately as possible. For example, if gearshifts in a transmission of the motor vehicle are to be controlled having regard to a route segment ahead of the motor vehicle, in the case of very long motor vehicles and if the distance between the location device and the center of gravity of the vehicle is large, a regulation of the said gearshifts on the basis of the position determined with reference to the location device can result in a gearshift taking place too early or even too late. In contrast, by carrying out the regulation concerned on the basis of the position related to the center of gravity of the vehicle an accurate control process can be realized. Now, by taking into account the distance between the installation point of the location device and the center of gravity of the vehicle it is easy, from the first position, to derive the second position relating to the center of gravity of the vehicle.

In DE 10 2008 026 370 A1 a speed of the motor vehicle in the longitudinal, direction is determined with reference to the data from the location device of the motor vehicle. In this case the said speed is determined for a center of gravity of the vehicle, and for this the position of the location device is taken into account. However, it is not described that on the basis of a position determined from the location device a further position of the motor vehicle is derived, which relates to the center of gravity of the vehicle. Exactly how the speed related to the center of gravity and how in this the installation point of the location device is taken into account, are also not disclosed.

In the context of the invention, the "center of gravity" of the vehicle is understood to mean the center of mass of the motor vehicle. The distance between the first position and the second position, which is related to the said center of mass of the motor vehicle, is the distance in the longitudinal direction of the motor vehicle between those two positions.

In the context of the invention, the location device is in particular permanently fitted at the installation point in the motor vehicle, but it can also be present in the form of a detachable unit. The important thing is that the position determined with reference to the location device is available at the corresponding point for offsetting by the said distance and for determining the position related to the center of gravity of the vehicle. Preferably, for that purpose the location device must be connected or connectable to a control unit.

In accordance with an embodiment of the invention, the first position is determined by satellite-supported position-determining means. In that way the first position can be determined in a tried and tested manner. Particularly preferably, this is done by means of a GPS system since in most motor vehicles such a system is in any case present. In a further development of this embodiment, the first position is then determined via a location device in the form of an antenna. In combination with the satellite-supported position-determining means the first position can in that way be determined in a suitable manner.

According to a further possible design of the invention, the distance between the installation point and the center of gravity of the vehicle is determined in that a variation of a parameter calculated from physical magnitudes is compared with a variation of the parameter which has been determined, taking into account the location device, with reference to carriageway parameters of a route of the motor vehicle. Thus, the distance is determined by comparing with one another variations of a parameter determined in different ways. In this case one variation of the parameter has been calculated on the basis of physical magnitudes, while in contrast the other variation has been determined with reference to carriageway parameters determined having regard to the location device and associated in particular with a route segment ahead of the motor vehicle. Thus, the variations are associated with the same parameter, but determined in different ways.

In a further development of the above-mentioned design possibility, a driving resistance of the motor vehicle is used as the said parameter. In that respect, a variation of this driving resistance is determined on the one hand from physical parameters of the motor vehicle, such as a torque of a drive engine of the motor vehicle, an acceleration of the motor vehicle, a mass of the motor vehicle, etc., whereas a further variation of the driving resistance is determined from carriageway parameters of the route wherein, besides the position at the time, the said carriageway parameters can also include a gradient and the like.

Furthermore, alternatively or in addition, with reference to the comparison a time offset between the variation calculated from physical parameters and the variation calculated having regard to carriageway parameters is determined, wherein from the said time offset and a current driving speed of the motor vehicle the distance between the location device and the center of gravity is determined. In that way, in a simple manner the distance can be derived by computation and with reference to existing data.

In the context of the invention, the distance between the location device and the center of gravity of the vehicle can be determined at fixed, predetermined points in time or even when particular situations exist. For example, the distance can be determined each time the motor vehicle is started.

In a further development of the invention, when calculating the second position a distance is also calculated, which has been determined from the time lapsed since the determination of the first position and a current driving speed of the motor vehicle. Correspondingly therefore, in addition the time-lapse since the determination of the first position is taken into account when determining the second position, because it can certainly be the case that since the first position was determined the vehicle has already covered a further stretch of the route. In that way the precision with which the second position is determined can be increased.

An object of the invention is also a method for controlling a motor vehicle, wherein for the said control a position of the motor vehicle is taken into account, which position has been determined in accordance with one or more of the above-mentioned variants. According to an embodiment of the invention, in this context and with reference to the position of the vehicle gearshifts in a transmission of the motor vehicle are controlled, this being done in an anticipatory manner having regard to a route segment ahead of the motor vehicle.

The invention also relates to a control unit, which is preferably a transmission control unit. In this case the said control unit is designed, by means of a location device, first of all to determine a first position related to an installation point of the location device in the motor vehicle, and then, with reference to the said first position, to determine a second position related to a center of gravity of the vehicle, in that the control unit offsets the first position by a distance between the installation point of the location device and the center of gravity of the vehicle. Furthermore, the control unit is also designed to be able to carry out a method in accordance with one or more of the aforesaid variants.

The method according to the invention can also be incorporated as a computer program product which, when it is run on a processor, for example a processor of a control unit of the type mentioned, instructs the processor by software means to carry out the associated process steps in accordance with the object of the invention. In this connection the object of the invention also includes a computer-readable medium on which the aforesaid computer program product is stored and from which it can be called up.

The invention is not limited to the indicated combination of the features of the independent claims or the claims that depend on them. There are additional options for combining individual features with one another so long as they emerge from the claims, from the following description of a preferred embodiment of the invention, or directly from the drawings. References in the claims to the drawings by the use of indexes are not intended to restrict the protective scope of the claims.

BRIEF DESCRIPTION OF THE DRAWINGS

An advantageous embodiment of the invention, which is explained in what follows, is illustrated in the drawings, which show.

DETAILED DESCRIPTION

Figure 1:
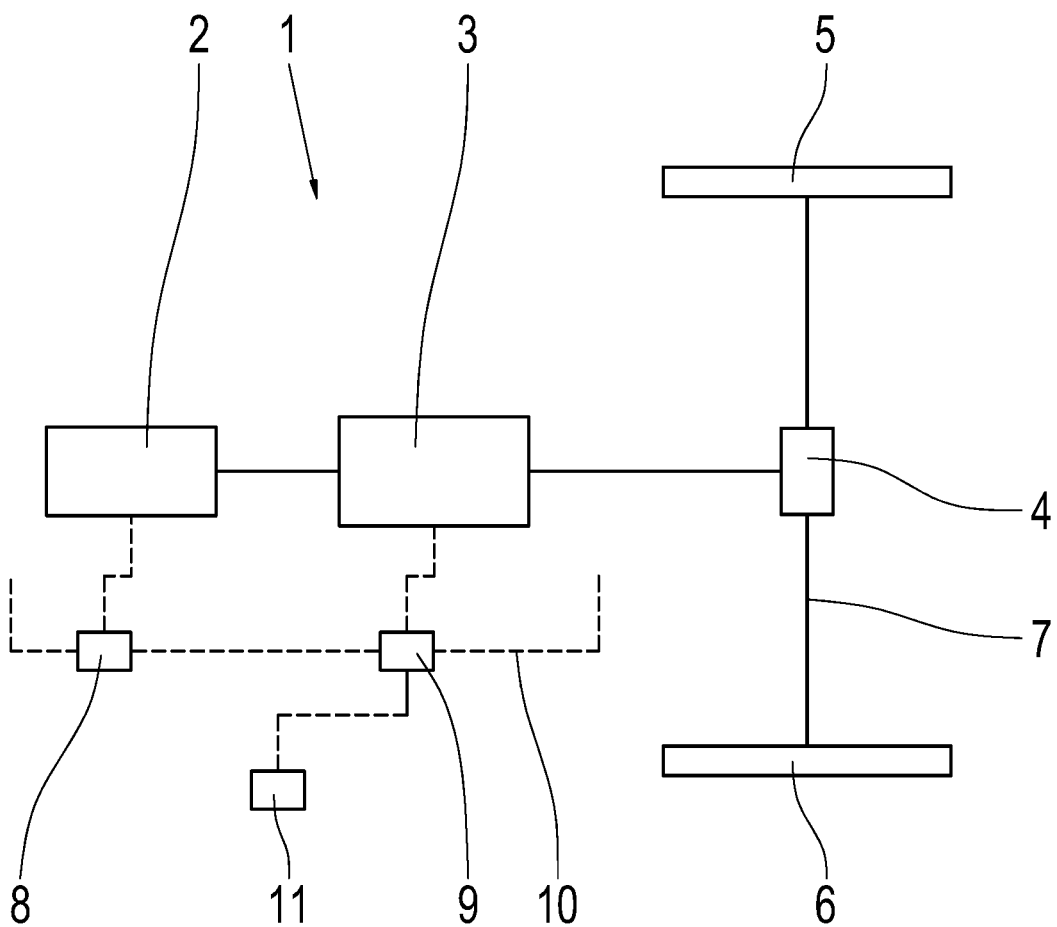
FIG. 1: A schematic view of a drivetrain of a motor vehicle.

FIG. 1 shows a schematic view of a drivetrain 1 of a motor vehicle, which is preferably a utility vehicle such as a truck. The drivetrain 1 comprises a drive engine 2, preferably in the form of an internal combustion engine, which is followed on the drive output side by a motor vehicle transmission 3. In this case, between the drive engine 2 and the motor vehicle transmission 3 there may be provided a torsion fluctuation damper and/or a starting element by means of which a driving connection between the drive engine 2 and the motor vehicle transmission 3 can be formed and also separated, such that this element can be in the form of a separator clutch or even a hydrodynamic torque converter. The motor vehicle transmission 3 is in particular an automated manual transmission or an automatic transmission, such that in that case the motor vehicle transmission 3 is of group design and can consist of a plurality of individual gear systems.

Within the drivetrain 1, downstream from the motor vehicle transmission 3 there is also a differential transmission 4 by way of which drive power is distributed to drive wheels 5 and 6 of a drive axle 7.

Associated with the drive engine 2 there is an engine control unit 8 by means of which the operation of the drive engine 2 is regulated. This engine control unit 8 is connected via a data bus system 10 of the motor vehicle to a further control unit 9, and besides the engine control unit 8 and the control unit 9, in particular further control units are part of the said data bus system 10. By way of the data bus system 10 the individual control units can exchange data with one another. In the present case the control unit 9 is a transmission control unit of the motor vehicle transmission 3 by means of which, among other things, gearshifts in the motor vehicle transmission 3 can be controlled.

In the present case, for that purpose the control unit 9 can carry out the gearshifts in the motor vehicle transmission 3 in an anticipatory manner having regard to a route segment to be covered by the motor vehicle, and in that way adapt to forthcoming driving situations. For example, a selective downshift in the motor vehicle transmission 3 can be carried out to react to a forthcoming uphill inclination of the road or else a longer downhill stretch, in order in the latter case to be able to utilize the higher effective drag torque of the drive engine 2. On the other hand, by carrying out an early upshift in the motor vehicle transmission 3 fuel-saving operation of the drive engine 2 having regard to the forthcoming route segment can be realized. Besides information about the route segment to be covered, the control unit 9 must also be supplied with information about the current position of the motor vehicle. For that purpose, the control unit 9 is connected with a location device 11 of the motor vehicle, which is preferably an antenna of a GPS system. Then, by virtue of the GPS system a satellite-supported determination of the position of the motor vehicle can be achieved.

However, for the control of the gearshifts in the motor vehicle transmission 3 it is advantageous to know a position related to a vehicle center of gravity of the motor vehicle in order to be able to initiate gearshifts at a position as accurately determined as possible and at the right time. Particularly with long vehicles such as trucks with one or more trailers, the position determined by way of the location device 11 can sometimes deviate substantially from the position related to the center of gravity of the vehicle, so that if the position related to the location device 11 were used this could result in gearshifts that are too early or even too late.

Figure 2:
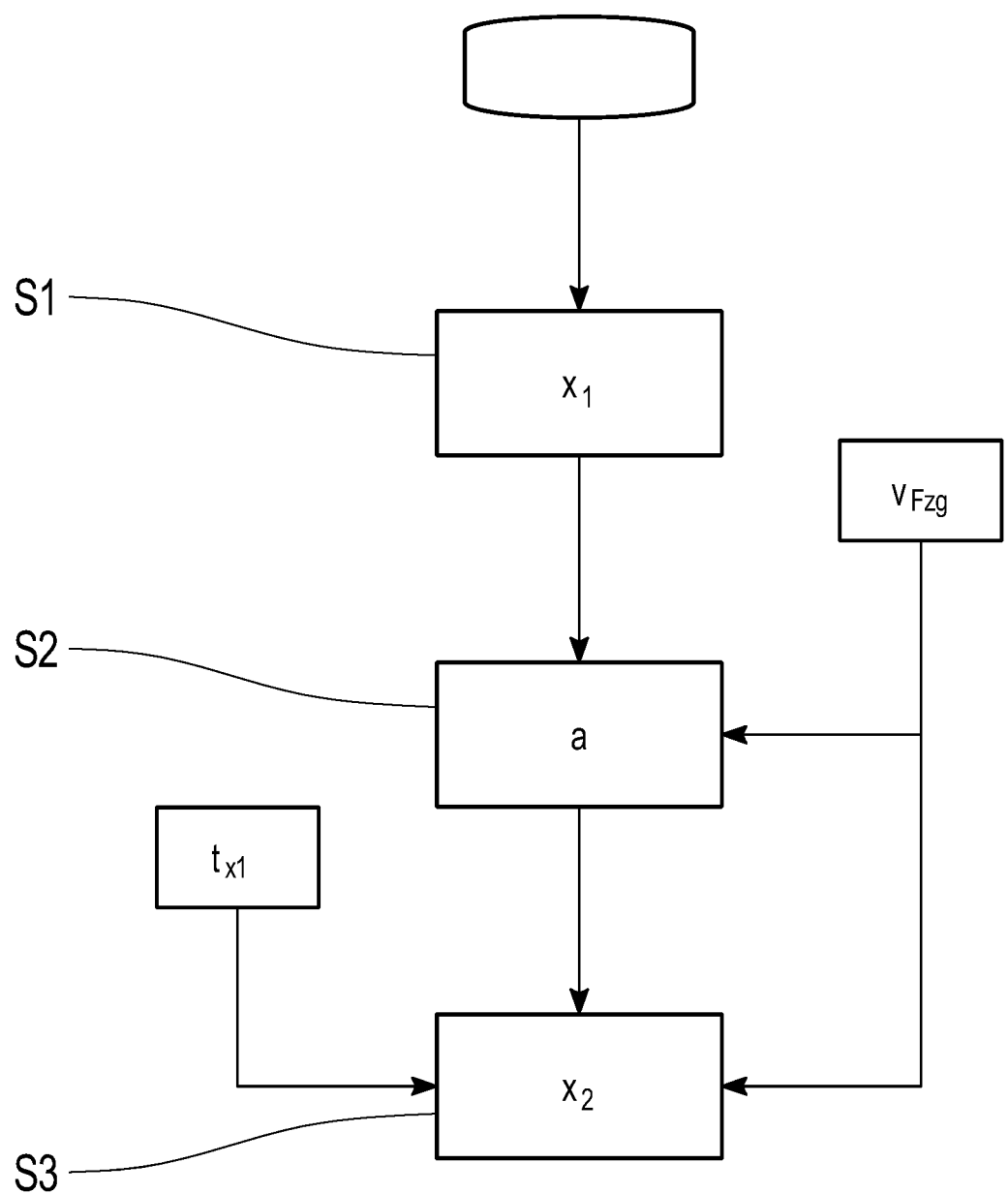
FIG. 2: A flow chart of a method for determining a position of the motor vehicle, in accordance with a preferred embodiment of the invention.

For this reason, in the present case and in the context of a method according to the invention a position is determined in accordance with a preferred embodiment of the invention, by virtue of which the position of the motor vehicle related to the center of gravity of the vehicle can be determined. As can be seen in FIG. 2, which shows an example of a flow chart of the method according to the invention, at the beginning of the process in a step S1 a first position $x_1$ is first called for, which position is related to an installation point of the location device 11 in the motor vehicle and is called for by the control unit 9 on the part of the location device 11. After this, in a step S2 a distance a is determined, between the location device 11 and a center of gravity of the motor vehicle at the time.

Figure 3A:
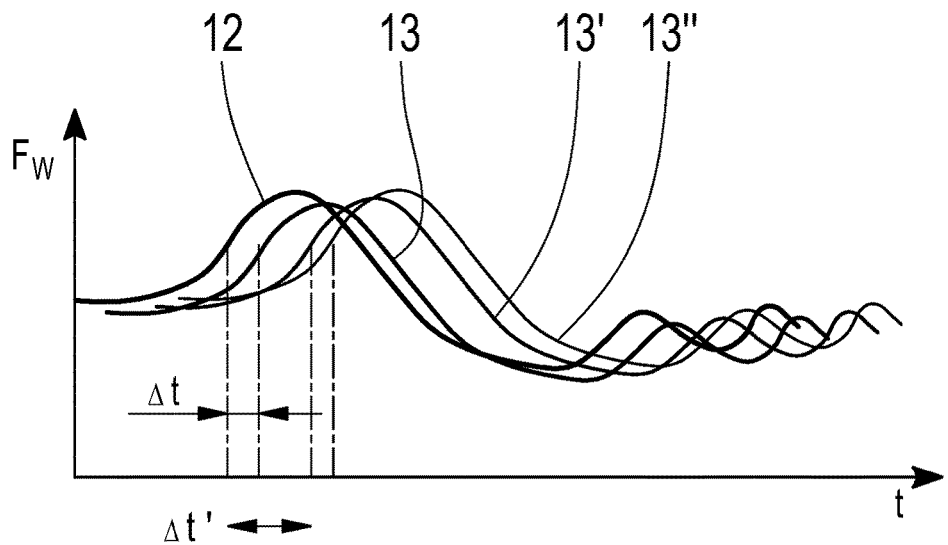
FIGS. 3A to 3D: Aspects of the carrying out of a determination of a distance between a location device and a vehicle center of gravity of the motor vehicle, in the context of the method.
Figure 3B:
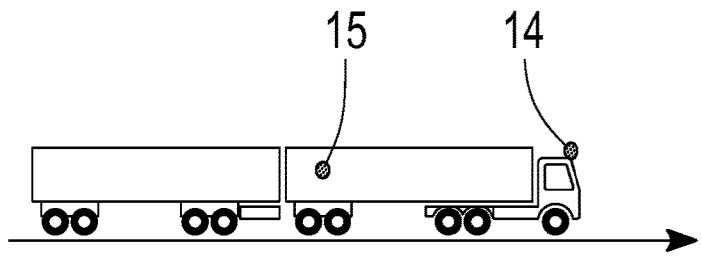
Figure 3C:
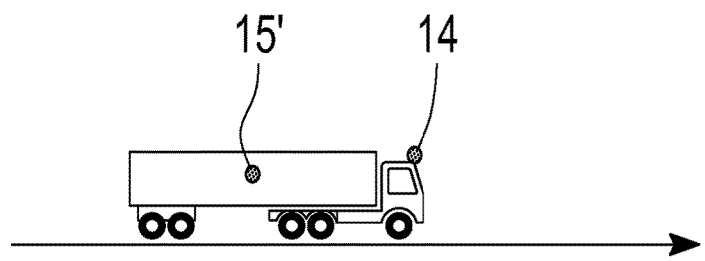
Figure 3D:
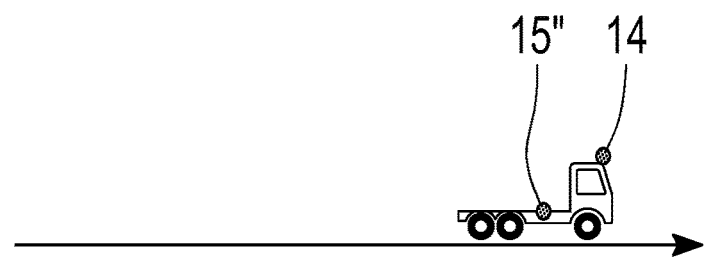

The distance a is determined by computer means with reference to various variation curves of a driving resistance $F_W$ of the motor vehicle, which are represented by the curves shown in FIG. 3A. In FIG. 3A variation curves of the driving resistance $F_W$ are plotted against time t. The curve 12 shows a variation of the driving resistance $F_W$ which has been calculated from physical magnitudes, namely magnitudes such as engine torque, acceleration and vehicle mass. By contrast, the respective variations 13 or 13' or 13" were determined with reference to carriageway parameters of the route segment ahead, taking account of the location device 11. Here, the curve 13 shows the variation of the driving resistance $F_W$ for the motor vehicle shown in FIG. 3B, whereas the curve 13' is associated with the motor vehicle shown in FIG. 3C and the curve 13" is associated with the motor vehicle shown in FIG. 3D. In FIGS. 3B to 3D, in each case an installation position 14 of the location device is shown in the front area of the motor vehicle, with the respective vehicle centers of gravity 15, 15' and 15" shown as well.

During the course of step S2, from a respective time offset $\Delta t$ or $\Delta t'$ or $\Delta t''$ between the curve 12 and the respective curves 13 or 13' or 13" and a current driving speed $v_{Fzg}$ the distance a is computed in each case using the equation:

$$a = \Delta t \cdot v_{Fzg}$$

With this distance a determined in that way, in a further step S3 a second position $x_2$ related to the respective vehicle center of gravity is calculated, and in doing this a time $t_{x1}$ that has lapsed since the determination of the first position $x_1$ is taken into account. Thus, the second position $x_2$ is calculated using the equation:

$$x_2 = x_1 + t_{x1} \cdot v_{Fzg} + a.$$

This second position $x_2$ is then subsequently used for the control of the motor vehicle transmission 3.

By means of a method according to the invention for determining a position of a motor vehicle, a position suitable for the control of a motor vehicle can be determined in a simple manner.

| Indexes | |
|---|---|
| 1 | Drivetrain |
| 2 | Drive engine |

-continued

| Indexes | |
|---|---|
| 3 | Motor vehicle transmission |
| 4 | Differential transmission |
| 5 | Drive wheel |
| 6 | Drive wheel |
| 7 | Drive axle |
| 8 | Engine control unit |
| 9 | Control unit |
| 10 | Data bus system |
| 11 | Location device |
| 12 | Variation curve |
| 13, 13', 13" | Variation curve |
| 14 | Installation point |
| 15, 15', 15" | Center of gravity of the vehicle |
| $x_1$ | First position |
| a | Distance |
| $F_W$ | Driving resistance |
| t | Time |
| $\Delta t, \Delta t', \Delta t''$ | Time offset |
| $v_{Fzg}$ | Driving speed |
| $x_2$ | Second position |
| $t_{x1}$ | Time |
| S1 to S3 | Individual steps |

The invention claimed is:

1. A method for determining a position of a motor vehicle, the method comprising:
   determining, by a location device of the motor vehicle, a first position related to an installation point of the location device in the motor vehicle;
   determining, by the location device, a second position related to a vehicle center of gravity based on the first position, wherein the first position is offset by a distance between the installation point of the location device and the vehicle center of gravity; and
   initiating a gearshift of the motor vehicle, by a transmission control unit, based at least in part on the position of the motor vehicle and the vehicle center of gravity, the position of the motor vehicle being related to the first position and the second position.

2. The method according to claim 1, wherein determining the first position is performed using an antenna.

3. The method according to claim 2, wherein determining the second position is performed using an antenna.

4. The method according to claim 1, further comprising determining the distance between the installation point and the vehicle center of gravity, wherein a first curve of a parameter calculated from physical magnitudes is compared with a second curve of the parameter which has been determined, having regard to the location device, with reference to carriageway parameters of a route segment of the motor vehicle.

5. The method according to claim 4, wherein the parameter is a driving resistance of the motor vehicle.

6. The method according to claim 5, wherein with reference to the comparison,
   determining a time offset between the first curve is performed using the physical magnitudes;
   determining the second curve is performed with reference to the carriageway parameters; and
   determining the distance of the installation point from the center of gravity of the vehicle is calculated from the time offset and a current driving speed of the motor vehicle.

7. The method according to claim 1, wherein determining the second position, includes determining a distance based on a time that has lapsed since determining the first position and based on a current driving speed of the vehicle.

8. The method of claim 1, wherein initiating the gearshift further takes into account a forthcoming route segment ahead of the motor vehicle.

9. The method of claim 8, wherein the forthcoming route segment ahead of the motor vehicle includes an uphill stretch or a downhill stretch of road.

10. The method of claim 9, wherein the motor vehicle is a truck with one or more trailers.

11. The method of claim 9, wherein initiating the gearshift further takes into account one or more parameters selected from an engine torque, a current driving speed, a driving resistance, a vehicle acceleration, and a vehicle mass.

12. A transmission control unit configured to operate with a location device in a motor vehicle, the transmission control unit configured to determine a first position relative to an installation point of the location device in the motor vehicle and to determine a second position with reference to the first position and to a center of gravity of the vehicle, and initiate a gearshift based at least in part on a position of the motor vehicle, wherein the transmission control unit offsets the first position by a distance between the installation point of the location device and the center of gravity of the vehicle, the position of the motor vehicle being related to the first position and the second position.

13. The transmission control unit according to claim 12, wherein the transmission control unit comprises an antenna and wherein determining the first position is performed using the antenna and determining the second position is performed using the antenna.

14. A computer program product for a transmission control unit configured to carry out a method comprising determining, by a location device in a motor vehicle, a first position related to an installation point of the location device in the motor vehicle, determining a second position related to a vehicle center of gravity based on the first position, wherein the first position is offset by a distance between the installation point of the location device and the vehicle center of gravity, and initiate a gearshift based at least in part on a position of the motor vehicle, the position of the vehicle being related to the first position and the second position, wherein a routine for determining a position of the motor vehicle is implemented by corresponding control commands stored in software.

15. A data carrier with a computer program product according to claim 14.

* * * * *